United States Patent [19]

Yoshigai

[11] Patent Number: 4,679,460
[45] Date of Patent: Jul. 14, 1987

[54] BRAKE LEVER DEVICE

[75] Inventor: Toshiharu Yoshigai, Higashi-Osaka, Japan

[73] Assignee: Yoshigai Kikai Kinzoku Kabushiki Kaisha, Higashi-Osaka, Japan

[21] Appl. No.: 804,784

[22] Filed: Dec. 5, 1985

[30] Foreign Application Priority Data

Feb. 2, 1985 [JP] Japan .................. 60-14483[U]

[51] Int. Cl.$^4$ .................. B62K 23/04; F16C 1/10
[52] U.S. Cl. .................. 74/489; 74/501 R; 74/522
[58] Field of Search .................. 74/489, 488, 501 R, 74/502.2, 522

[56] References Cited

U.S. PATENT DOCUMENTS

| 3,974,712 | 8/1976 | Kaufman et al. | 74/489 |
| 4,100,820 | 7/1978 | Evett | 74/531 |
| 4,232,565 | 11/1980 | Leonheart | 74/501 B X |
| 4,425,819 | 1/1984 | Shimano | 74/489 |
| 4,459,871 | 7/1984 | Shimano | 74/489 |
| 4,480,720 | 11/1984 | Shiman | 74/501 B X |
| 4,644,816 | 2/1987 | Cockburn | 74/489 X |

FOREIGN PATENT DOCUMENTS 0051973 5/1982 European Pat. Off. .............. 489/

Primary Examiner—Cornelius J. Husar
Assistant Examiner—Peter M. Cuomo
Attorney, Agent, or Firm—Sixbey, Friedman & Leedom

[57] ABSTRACT

A brake lever device that permits selective and interchangeable introduction of a Bowden cable to a brake lever via either of the top and base of a hollow housing of the device. To this end, the brake lever of the device is provided with first and second connectors to which an inner wire of the Bowden cable is connected to the brake lever, a first opening is provided at the base of the hollow housing and a second opening provided at the top of the hollow housing, a first retainer, which retains an outer sheath of the Bowden cable while permitting passage of the inner wire, is situated between the first opening of the housing and the first conductor of the brake lever, while a second such retainer is situated between the second opening of the housing and the second connector of the brake lever. Additionally, a covering is provided for covering the second opening when the Bowden cable is introduced via the first opening, but which may be removed for enabling use of the second opening.

7 Claims, 5 Drawing Figures

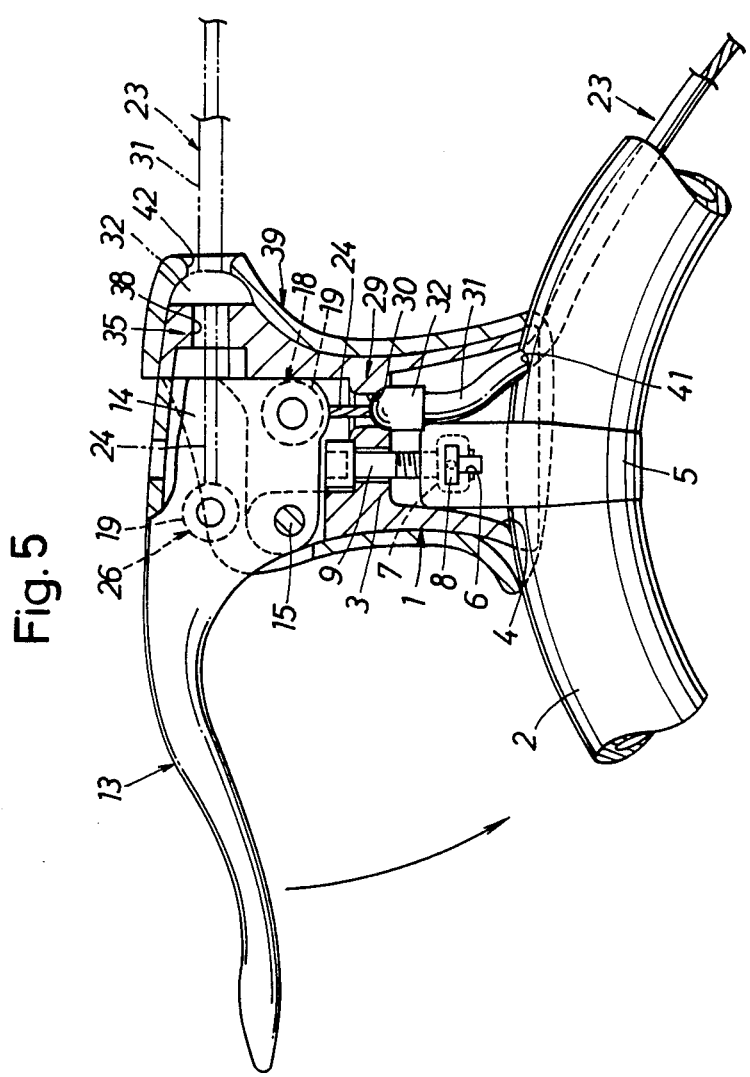

4,679,460

BRAKE LEVER DEVICE

FIELD OF THE INVENTION AND DESCRIPTION OF THE RELATED ART

The present invention relates to a brake lever device used mainly for a bicycle.

The construction of the brake lever device for the bicycle and the like is that a housing mounted to a handle in a projecting manner and an operational lever being rotatably pivoted to the projecting end side of the afore-mentioned housing are provided, and the base of the operational lever is equipped with an inner connecting part for connecting the inner wire of a Bowden cable, while the housing is equipped with a outer receiving part which supports the outer of wire the Bowden cable and, at the same time, adapts the inner to be passed on to the afore-mentioned inner connecting part in an insertable manner, whereby a rotational operation of the operational lever permits the inner of the Bowden cable to be stretched with respect to the outer.

Conventionally, the arrangement employed by the afore-mentioned type of the brake lever device is divided into two kinds including the construction in which the Bowden cable is adapted to be introduced from the side of the projecting end portion of the housing, such a projecting end side of the housing being equipped with the outer receiving part and the construction in which the outer receiving part is provided on the side nearer to the handle then the inner connecting part in the housing, and the Bowden cable is introduced from the base side of the housing into the housing, thereby making it possible to wire the Bowden cable along the handle without extruding extremely the Bowden cable to the outside, these two kinds of the brake levers being selected for use, depending upon the type of the bicycle or the inclination of purchasers.

For this reason, an extreme inconvenience of the past lies in the necessity of manufacturing two kinds of the brake lever devices in response to a selection made depending upon the type of the bicycle and the like. Further inconvenience is that when making a change from the state where the Bowden cable is introduced from the projecting end side of the housing to its insertion from the base side of the housing, and vice versa, there is a necessity of making a replacement with a very different type of brake lever device.

OUTLINE AND PURPOSE OF THE INVENTION

The purpose of the present invention is to facilitate a conversion from the state where the Bowden cable is introduced from the projecting end side of the housing to its introduction from the base end of the housing, and vice versa without necessity of making a replacement with the different brake lever device.

Further purpose of the present invention is to make an arrangement in which it becomes easier to load the operation lever and the housing with the Bowden cable so that a rotational operation of the operational lever may enable the inner wire to be stretched with respect to the outer sheath when introducing the Bowden cable into the projeccting end side of the housing.

Still further purpose of the present invention will be apparent from the undermentioned description and the accompanying drawings.

According to the present invention, the first inner connecting part for connecting detachably the inner wire is provided on the side toward which a rotational operation of the base part of the operational lever causes the housing to be extruded, and at the same time for supporting the outer sheath on the side nearer to the handle than the first inner connecting part in the housing, the first outer receiving part which adapts the inner wire to be passed to the first inner connecting part in an insertable manner is provided. Such a construction enables the operational lever and the housing to be loaded with the Bowden cable which has been introduced from the base end side of the housing.

On the other hand, according to the present invention, the second inner connecting part for detachably connecting the inner wire is provided on the side which is perpendicular to the projectingly moving direction of the housing the motion of which is permitted by a rotational operation of the base part of the operational lever, and, at the same time for supporting the outer sheath on the side opposite to the afore-mentioned providing positon of the second inner connecting part, the second outer receiving part which adapts the inner wire to be passed to the second inner connecting part in an insertable manner is provided. Such a construction enables the operational lever and the housing to be loaded with the Bowden cable which has been introduced from the projecting end side of the housing.

BRIEF DESCRIPTION OF THE DRAWINGS

FIG. 5 is a side sectional view of another embodiment.

DETAILED DESCRIPTION OF THE PREFERRED EMBODIMENT OF THE PRESENT INVENTION

Figure 1:
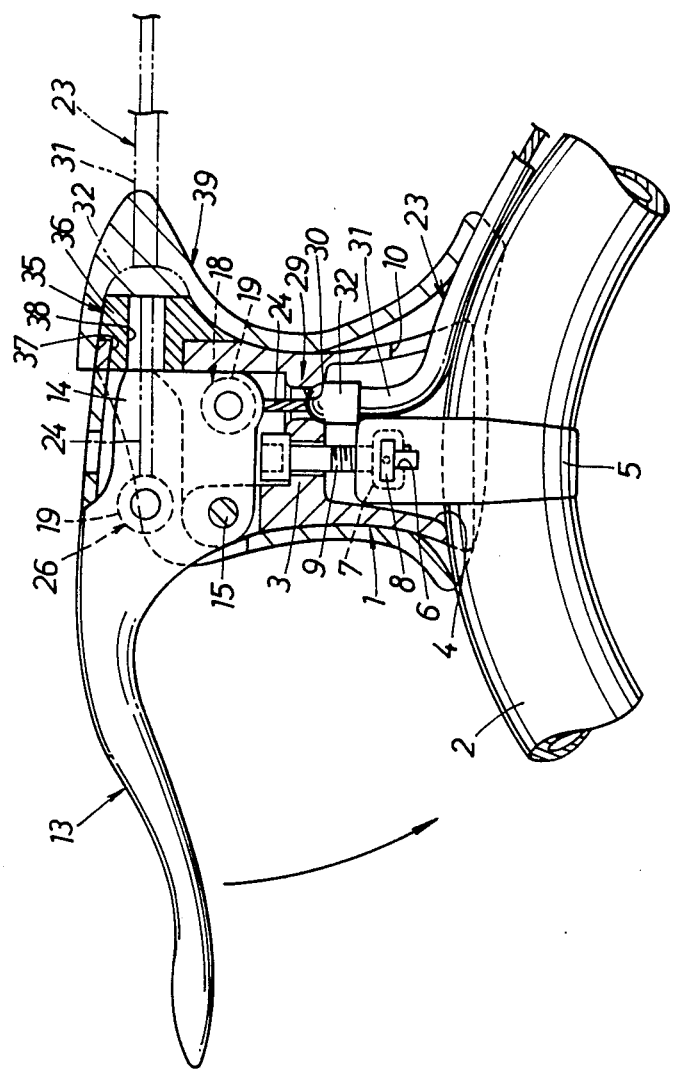
FIG. 1, illustrates an embodiment of the present invention, is a and side sectional view of the state where the Bowden wire is introduced from the base end part.
Figure 2:
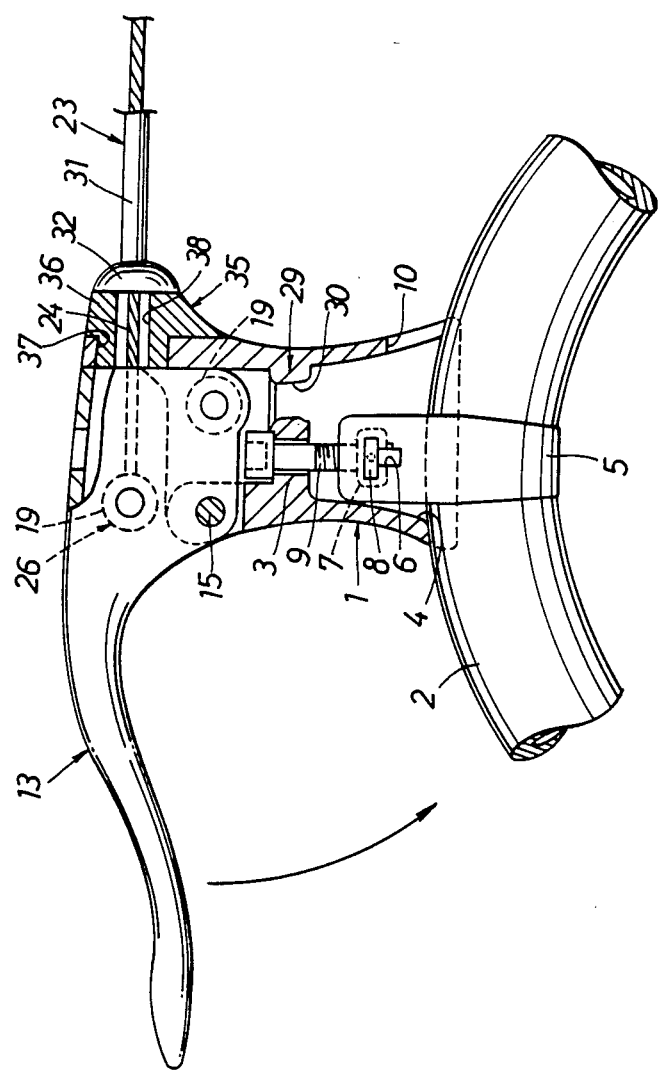
FIG. 2 is a side sectional view of the state where the afore-mentioned Bowden cable is introduced from the projecting end side.

Referring first to FIGS. 1 and 2, which illustrate the embodiment of the present invention, 1 is the housing mounted to the handle 2 in a projecting manner, such a housing being formed to be of square cylinder and having its inside integrally equipped with a partition wall 3 dividing vertically the inside. This housing 1 is detachably fixed to the handle 2 by a fastening band 5 under the state where the opening edge of a lower opening portion 4 is adapted to get in contact with the side along the handle 2. Namely, at the same time when the fastening band 5 holds the peripheral face of the handle 2, lugs 8 on both the ends of a nut 7 are held in holding holes 6 on both the ends respectively of the band 5, a bolt 9 being vertically inserted into the partition wall 3 is screwed into the nut 7, and the nut 7 is pulled near to the inside of the housing 1, thereby causing the band 5 to fasten the handle 2. 10 is a wire introduction port being formed by notching the lower front end of the housing 1.

13 is the operational lever, the base 14 of which is internally inserted into the upper side of the housing 1 and is pivotally mounted to the upper part of the housing such that it may be rotationally movable around a supporting shaft 15, the top end side of the operational lever 13 being adapted to project from the housing 1 to the rear side.

Figure 3:
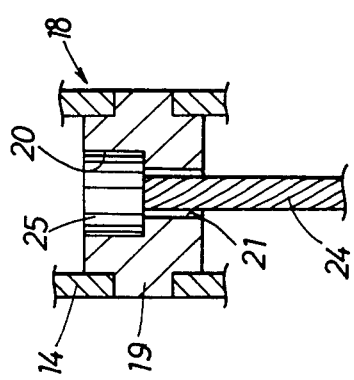
FIG. 3 is a partial sectional view of the first inner connecting part.
Figure 4:
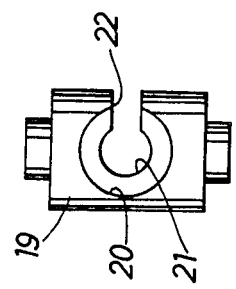
FIG. 4 is a plan view of the first inner connecting part.

18 is the first inner connecting part, provided in the lever 13, which is positioned before the supporting shaft 15 of the base 14, i.e. is provided on the side in the direction of which a rotational operation of the lever 13 permits a upward motion of the first inner connecting part 18 to be made. This first inner connecting part 18 comprises a connecting article 19, of a roll-shape, which is rotatably fitted around the shaft in the base 14. As shown in FIGS. 3 and 4, the connecting article 19 is constructed such that it possesses a recessed holding part 20, a penetrating hole 21 which communicates with the recessed holding part 20, and a notched groove 22 which by the penetrating hole 21 opens into the circumferential face of the connecting article 19 and enables the inner wire 24 of the Bowden wire 23 to be inserted into the penetrating hole 21. A holding article 25 is fixed to the end part of the inner wire 24 and is adapted to be held in the recessed holding part 20, whereby the inner wire 24 is detachably connected to the base 14 of the lever 13.

26 is the second inner connecting part, which is provided over the supporting shaft 15 of the base 14, i.e. is positioned on the side in the direction of which a rotational opertion of the lever 13 permits a rearward motion of the second inner connecting part 26 to be made. This second connecting part 26, similarly to the first connecting part 18, comprises the connecting article 19 which is rotatably fitted around the shaft in the base 14, and is constructed to connect rotatably by way of the connecting article 19 the inner wire 24 to the base 14 of the lever 13.

29 is the first outer receiving part, provided in the housing 1, which comprises an inserting hole 30 being formed vertically in the partition wall 30 correspondingly to the lower part of the first inner connecting part 18 and is constructed such that while the outer sheath 31 of the Bowden wire 23 is extremely closely supported by way of the holding article 32 provided on its end part in the lower opening edge of the inserting hole 30, the inner wire 24 being extruded from the outer sheath 31 is adapted to extend out of the inserting hole 30 toward to the first inner connecting part 18.

35 is the second outer receiving part, provided before the second inner connecting part 26, which comprises an article forming the receiving part 36, constructed separately from the housing 1, and being squarely fitted in a mounting hole 37 on the upper front end of the housing 1. The longitudinal inserting hole 38 is formed in the aforementioned article forming the receiving part 36, and the second outer receiving part 35 is constructed such that while the outer sheath 31 is closely supported by way of the holding article 32 in the front opening edge of the mounting hole 37, the inner wire 24 being extruded from the outer sheath 31 is adapted to extend out of the mounting hole 37 toward the second inner connecting part 26. 39 is a rubber cover, which covers the external periphery of the housing 1.

A description of the action may be made as follows:

In the case of introducing the Bowden wire 23 from the base end side of the housing 1, as shown in FIG. 1, it is all right that the Bowden cable 23 being wired along the handle 2 is introduced from the wire introduction port 10 into the housing 1, and while the outer sheath 31 of the afore-mentioned Bowden wire 23 is supported in the first outer receiving part 29, the inner wire 24 is inserted from the outer receiving part 29 toward the first inner connecting part 18, thereby connecting the end of the inner wire 24 to the afore-mentioned connecting part 18. On the other hand, in the case of introducing the Bowden cable 23 from the projecting end side of the housing 1, as shown in FIG. 2, it is all right that while the outer sheath 31 of the Bowden cable 23 is supported in the second outer receiving part 35, the inner wire 24 extends out of the outer receiving part 35 toward the second inner connecting part 26, thereby connecting the end of the inner wire 24 to the afore-mentioned connecting part 26. For this reason, there is no necessity to replace the brake lever device in response to the conversion from the state where the Bowden cable 23 is introduced from the projecting end side of the housing 1 to the state where it is introduced from the base end side of the housing 1, and vice versa so that such a conversion is enabled to be optionally facilitated.

Referring now to FIG. 5 which illustrates another embodiment, the arrangement is shown in which the second outer receiving part 35 possessing the inserting hole 38 is integrally provided in the housing 1. Furthermore, the wire introduction port 10 is not provided in the housing 1, and the Bowden cabe 23 being wired within the handle 2 is adapted to pass through the hole 41 provided in the handle 2 and to be introduced from the lower opening part 4 of the housing 1 to the inside thereof. In addition to that the wire introduction hole 42 is provided in the cover 39 correspondingly to the inserting hole 38 of the second outer receiving part 35, thereby making possible to support the outer 31 of the Bowden cable 23 in the second outer receiving part 35 without necessity of detaching the cover 39. Other points are constructed to be identical to the foregoing embodiment.

What is claimed is:

1. A brake lever device comprising a cylindrical housing which is attached to project from a handle bar with a base opening of the housing removably held against the handle bar by a fastening band; a brake lever pivotally mounted on the housing for movement in a top of the housing; a Bowden cable connected for being operated by rotational operation of the brake lever;

wherein a first inner connector is provided on a lever base as a means for removably clamping an inner wire of the Bowden cable so as to draw the inner wire upwardly into the housing, upon rotation of the brake lever, and a second inner connector is provided on the lever base as a means for removably clamping the inner wire so as to draw the inner wire sidewardly into the housing, the inner wire being selectively connectable to either of both said connectors;

wherein a port through which the Bowden cable is insertable is notched at a base edge of the housing close to the handle bar and a first outer receiver is provided in the housing at a position closer toward the handle bar than the first inner connector for receiving an outer sheath of the Bowden cable and through which the inner wire is introducable to the first connector, and a second outer receiver is provided on the top of the housing, at a position at an opposite side of the pivotal mounting of the lever from a hand manipulable portion of the lever, for receiving a terminal end of the outer sheath of the Bowden cable and through which the inner wire is introducable to the second wire connector; and wherein the first inner connector comprises a freely rotatable roll connector having means for removably clamping a terminal end of the inner wire so that, upon pivoting of the lever, the inner wire, when introduced from said port will be pulled relative to the outer sheath, and the second inner connector comprises a freely rotatable roll connector having means for removably clamping said terminal end of the inner wire so that, upon rotation of the lever, the inner wire, when introduced at the housing top will be pulled relative to the outer sheath, and wherein a removable rubber cover is provided for mounting over said outer surface of said housing when the Bowden cable is introduced through said port and said cover being removed when the Bowden cable is introduced at the top of the housing.

2. A brake lever device according to claim 1, wherein said roll connector of each of the first and second inner connectors has a recess, a hole communicating with the recess and a groove connecting the hole to a peripheral surface of the connector and is adapted to removably clamp the terminal end of the wire by engaging of a holder fixed at said terminal end in the recess.

3. A brake lever device according to claim 1, wherein the first outer receiver is a hole formed on a wall partitioning an interior space of the housing, said hole being disposed in alignment with the first inner connector and the first outer receiver is adapted to restrict entry of the terminal end of the outer sheath by a holder provided at a lower end of the hole, while the inner wire is allowed to extend through the hole to the first inner connector.

4. A brake lever device according to claim 3, wherein the second outer receiver is formed of a receiver body that is a separate part from the housing, is mounted in a mounting hole of the housing, has a through hole and restricts entry of a terminal end of the outer sheath by a holder provided by an outer end of its through hole, while the inner wire is allowed to extend therethrough to the second connector.

5. A brake lever device according to claim 2, wherein the second outer receiver is formed of a receiver body that is a separated part from the housing, is mounted in a mounting hole of the housing, has a through hole and restricts entry of a terminal end of the outer sheath by a holder provided by an outer end of its through hole, while the inner wire is allowed to extend therethrough to the second connector.

6. A brake lever device according to claim 1, wherein the second outer receiver is formed of a receiver body that is a separate part from the housing, is mounted in a mounting hole of the housing, has a through hole and restricts entry of a terminal end of the outer sheath by a holder provided by an outer end of its through hole, while the inner wire is allowed to extend therethrough to the second connector.

7. In a brake lever device of the type having a brake lever pivotally connected to a hollow housing, wherein the hollow housing has opening means for permitting a Bowden cable to be inserted therein and retainer means for retaining an outer sheath of the Bowden cable while permitting passage of an inner wire of the Bowden cable to a connector means for connecting the inner wire to the brake lever, whereby the inner wire will be extruded from the outer sheath when the brake lever is operated to produce pivotal movement thereof; the improvement providing conversion means for enabling selective and interchangeable introduction of said Bowden cable to said connector means from either a base of the hollow housing at which said hollow housing is fastenable to a handle bar and a top of said hollow housing relative to said base, without replacing parts of said brake lever device, said conversion means comprising first and second said connector means being provided on said brake lever, a first said opening means at the base of the hollow housing, a second said opening means at said top of the hollow housing, a first said retainer means situated between the first opening means and the first connector means, a second said retainer means situated between the second opening means and the second connector means, and covering means for covering said second opening when said Bowden cable is introduced via said first opening means, said covering means being removable for enabling use of said second opening means.

* * * * *